Patented June 16, 1953

2,642,433

UNITED STATES PATENT OFFICE 2,642,433

α-AMINO-α,α-DIPHENYLACETIC ACID DERIVATIVES AND METHOD OF PREPARING SAME

Robert Duschinsky, Essex Fells, N. J., assignor to Hoffmann-La Roche Inc., Nutley, N. J., a corporation of New Jersey No Drawing. Application November 17, 1949, Serial No. 128,006

18 Claims. (Cl. 260—294.3)

This invention in its broader aspects relates to a new method for preparing generally α-amino-α,α-diphenylacetamides, α-amino-α,α-diphenylacetic acid esters, and α,amino-α,α-diphenylthioacetic acid esters. Another, more particular, aspect of the invention embraces as new compounds the lower alkyl esters of α-amino-α,α-diphenylacetic acid and the corresponding esters of α-amino-α,α-diphenylthioacetic acid.

The invention further encompasses as new compounds the tertiaryaminoalkyl esters of α-amino-α,α-diphenylacetic acid and the corresponding esters of α-amino-α,α-diphenylthioacetic acid, and the salts thereof, which in the form of their free bases can be represented by the following formula:

$$Ph_2C(NH_2)-CO-X-CH_2-R-N(R_1)(R_2)$$

where Ph stands for a phenyl radical, X for oxygen or sulfur, R for a lower alkylene radical, and $R_1$ and $R_2$ are members of the class consisting of lower alkyl radicals and further members where $R_1$ and $R_2$ taken with N form a heterocyclic radical, as piperidino, morpholino, and pyrrolidino radicals.

Compounds of the instant invention are of interest for their medicinal properties, for example, as analgesics, hypnotics, anticonvulsants and spasmolytics.

The process for preparing the α-amino-α,α-diphenylacetamides comprises reacting 4,4-diphenyl-2,5-oxazolidinedione with a nitrogen base as, for example, ammonia, a primary amine, as methylamine, ethylamine, 2-amino-ethanol, propylamine, aniline, benzylamine, benzhydrylamine, and the like. The reaction is carried out preferably by heating the reagents in the presence of a suitable solvent, or by fusing the reagents together. Aqueous ammonia reacts readily at room temperature or slight warming with the 4,4-diphenyl-2,5-oxazolidinedione to yield α-amino-α,α-diphenylacetamide, which is a known compound.

The process for preparing the esters comprises reacting 4,4-diphenyl-2,5-oxazolidinedione with a lower alkanol or alkanethiol, tertiaryaminoalkanol or tertiaryaminoalkanethiol as, for example, dialkylaminoalkanols, dialkylaminoalkanethiols, N-heterocyclic alkanols and N-heterocyclic alkanethiols. The tertiaryaminoalkanols and tertiaryaminoalkanethiols employed can be represented by the following formula:

$$HX-CH_2-R-N(R_1)(R_2)$$

wherein X, R, $R_1$ and $R_2$ have the same meaning as hereinabove assigned thereto. The reaction is readily carried out by heating the reagents in the presence of a suitable solvent or by fusing the reagents together, preferably in the presence of an hydrogen halide, such as hydrogen chloride or hydrogen bromide, whereby the hydrohalides of the esters are directly obtained. The hydrohalide salts can be readily converted into the free bases with an alkaline agent as, for example, sodium hydroxide, sodium carbonate, or ammonia in the usual manner.

The 4,4-diphenyl-2,5-oxazolidinedione is a new compound, and is claimed in my application Serial No. 128,005, filed of even date herewith and now United States Patent No. 2,578,293, issued December 11, 1951. It can be prepared as described therein by reacting α-amino-α,α-diphenylacetic acid with ethyl chloroformate to form α-carbethoxyamino-α,α-diphenylacetic acid, and cyclizing the latter compound with thionyl chloride. More specifically, the 4,4-diphenyl-2,5-oxazolidinedione can be prepared as follows. To a solution of 41.7 grams of α-amino-α,α-diphenylacetic acid in 200 cc. of 1 N sodium hydroxide there were added in portions with stirring 1 N sodium hydroxide and ethyl chloroformate until a total of 615 cc. of sodium hydroxide and 56.6 grams of ethyl chloroformate had been used. 400 cc. of ether were then added and the mixture was acidified with 80 cc. of 5 N hydrochloric acid and shaken. The ether layer was separated, the aqueous layer was extracted with 200 cc. of ether, and the combined ether layers were dried over sodium sulfate, and evaporated. The resulting oily residue upon cooling yielded crude crystalline α-carbethoxyamino - α,α - diphenylacetic acid, a sample of which upon recrystallization from benzene-petroleum ether, melted at 152–153° C. The crude α-carbethoxyamino-α,α-diphenylacetic acid was mixed with 50 cc. of thionyl chloride and heated for 30 minutes at 80° C. by which time gas evolution had stopped and crystals had begun to separate. Excess thionyl chloride was evaporated and the residue was crystallized by mixing with 150 cc. of benzene and gradual addition of 150 cc. of petroleum ether. The mother liquor yielded a second crop of crystals upon evaporation and addition of petroleum ether. The 4,4-diphenyl - 2,5 - oxazolidinedione thus obtained melts at 166–167° C.

The following examples will serve to illustrate the invention.

*Example 1*

160 cc. of 28 per cent aqueous ammonia were added with stirring to a solution of 20 grams of 4,4-diphenyl-2,5-oxazolidinedione in 30 cc. of dioxane. An exothermic reaction occurred after which the mixture was heated at 45–50° C. for 10 minutes with continuous stirring and then cooled in an ice bath. The crystallized α-amino-α,α-diphenylacetamide was filtered and washed with water. The compound melted at 150–151° C.

A solution of 8.5 grams of α-amino-α,α-diphenylacetamide in 25 cc. of ethanol was mixed with 5 cc. of 9 N alcoholic hydrochloric acid. Upon addition of 25 cc. of ether, α-amino-α,α-diphenylacetamide hydrochloride crystallized, M. P. 258° C. The salt is readily soluble in water.

*Example 2*

A mixture of 5 grams of 4,4-diphenyl-2,5-oxazolidinedione and 50 cc. of 25 per cent aqueous methylamine was heated with stirring on a water bath. After 25 minutes the temperature had reached 75° C. and the gas evolution had stopped. Upon cooling, α-amino-α,α-diphenyl-N-methylacetamide crystallized. The crystals were filtered, washed with water, then with 2 cc. of a mixture of equal volumes of ethanol and ether, and finally with 10 cc. of ether. The purified α-amino-α,α-diphenyl-N-methylacetamide melted at 133–134° C.

For the conversion into the hydrochloride the α-amino-α,α-diphenyl-N-methylacetamide was dissolved in 30 cc. of ethanol by heating at 60° C. The solution was acidified with 4 cc. of 5.9 N alcoholic hydrochloric acid, and upon addition of ether, the hydrochloride of α-amino-α,α-diphenyl-N-methylacetamide crystallized, M. P. 236–239° C. The substance was dried in vacuo at 120° C. in order to remove ethanol of crystallization.

*Example 3*

A mixture of 1 gram of 4,4-diphenyl-2,5-oxazolidinedione and 1 cc. of 2-aminoethanol was heated gradually in a nitrogen atmosphere up to 250° C. After ½ hour, evolution of the carbon dioxide which formed during the reaction had stopped. The excess of the 2-aminoethanol was then evaporated in vacuo at 250° C. The remaining thick oil, yielded when taken up with alcoholic hydrochloric acid followed by addition of ether, crystals of α-amino-α,α-diphenyl-N-(2-hydroxyethyl)acetamide hydrochloride melting at 171–173° C., which after recrystallization from ethanol-ether melted at 177–179° C.

*Example 4*

A solution of 2.5 grams of 4,4-diphenyl-2,5-oxazolidinedione in 10 cc. of dioxane was mixed with 1.8 cc. of aniline and then refluxed for 10 minutes. It was then evaporated on the steam bath and heated thereon for 2 hours. The solid residue obtained was recrystallized from 25 cc. of ethanol, yielding α-amino-α,α,N-triphenylacetamide, M. P. 145–146° C. By treating the amide with hydrochloric acid, the water soluble hydrochloride was obtained.

*Example 5*

A mixture of 0.25 gram of 4,4-diphenyl-2,5-oxazolidinedione and 0.43 gram of benzylamine was heated to 150–160° C. for 20 minutes. The resulting oil was crystallized from aqueous ethanol. The crude amide was transformed into the hydrochloride by adding alcoholic hydrochloric acid and ether. The resulting α-amino-α,α-diphenyl-N-benzylacetamide hydrochloride melted at 230° C.

*Example 6*

A mixture of 1 gram of 4,4-diphenyl-2,5-oxazolidinedione and 0.69 cc. of benzhydrylamine was heated at 160–175° C. for 40 minutes by which time the carbon dioxide evolution had stopped. The reaction mixture was dissolved in 10 cc. of dioxane. Upon addition of 20 cc. of petroleum ether, crystals of α-amino-α,α-diphenyl-N-benzhydrylacetamide, melting at 163–164° C., were obtained. After recrystallization from ethanol the compound melted at 165° C.

*Example 7*

A solution of 6 grams of 4,4-diphenyl-2,5-oxazolidinedione in 60 cc. of 5.9 N ethanolic hydrochloric acid was refluxed for ¾ of an hour. Considerable evolution of carbon dioxide occurred. Introduction of hydrogen chloride gas into the cooled mixture and refluxing produced only a slight additional evolution of carbon dioxide. The reaction mixture was then evaporated to dryness giving a crystalline mass which was treated with 20 cc. of acetone and 20 cc. of ether. The ethyl α-amino-α,α-diphenylacetate hydrochloride thus obtained melted at about 200° C. It could be recrystallized from dioxane.

For the preparation of the base 11.7 grams of the hydrochloride was shaken with 100 cc. of 1 N sodium carbonate and 50 cc. of ether. The aqueous layer was extracted with 25 cc. of ether. The combined ether layers were dried over sodium sulfate. The residue obtained after evaporation of the extract was crystallized from petroleum ether yielding thin prisms of ethyl α-amino-α,α-diphenylacetate melting at 48–49° C. The ester can be recrystallized by dissolution in ethanol and addition of water.

*Example 8*

A mixture of 1 gram of 4,4-diphenyl-2,5-oxazolidinedione and 0.36 gram of 2-dimethylaminoethanol was heated for 20 minutes at 150° C. in a stream of dry hydrogen chloride gas. The melted reaction mixture was crystallized from a mixture of acetone, ethanol and ether. After recrystallization from methanol-ether the 2-dimethylaminoethyl α-amino-α,α-diphenylacetate dihydrochloride melted at 225° C. (with decomposition).

*Example 9*

A mixture of 7.6 grams of 4,4-diphenyl-2,5-oxazolidinedione and 4.6 grams of 2-diethylaminoethanol hydrochloride was fused in a stream of hydrogen chloride gas at 140–150° C. for one hour. The hydrogen chloride gas was swept out by nitrogen and the residue was crystallized from 25 cc. of acetone. The mother liquor gave upon addition of ether a second crop of crystals of 2-diethylaminoethyl α-amino-α,α-diphenylacetate dihydrochloride. The compound, after recrystallization from methanol-ether, melted at 220° C. (with decomposition).

*Example 10*

A mixture of 5.06 grams of 4,4-diphenyl-2,5-oxazolidinedione and 4 grams of 2,2-dimethyl-3-diethylaminopropanol hydrochloride was fused in a stream of hydrogen chloride gas at 140° C. for 25 minutes. After displacement of the hydrogen chloride gas by nitrogen the obtained melt was crystallized from 30 cc. acetone. The product was recrystallized by dissolving it in 20 cc. of methanol and addition of 30 cc. of acetone and 30 cc. of ether, the resulting 2,2-dimethyl-3-diethylaminopropyl α-amino-α,α-diphenylacetate dihydrochloride melted with decomposition at 230° C.

*Example 11*

A mixture of 1 gram of 4,4-diphenyl-2,5-oxazolidinedione and 0.52 gram of 1-piperidineethanol was fused in a stream of hydrogen chloride gas at 155° C. for one hour. After displacement of the hydrogen chloride gas by nitrogen, the solid residue was taken up and washed with acetone. After recrystallization from 30 cc. of methanol and 60 cc. of ether the 2-(1-piperidylethyl) α-amino-α,α-diphenylacetate dihydrochloride melted with decomposition at 244° C.

*Example 12*

A mixture of 7.6 grams of 4,4-diphenyl-2,5-oxazolidinedione and 5.09 grams of diethylaminoethanethiol hydrochloride was fused in an oil bath of 140–150° C. for 25 minutes while a stream of hydrogen chloride gas was passed through the melt. After displacement of the hydrogen chloride gas by nitrogen, acetone and ether were added to the melt whereupon 2-diethylaminoethyl α-amino-α,α-diphenylthiolacetate dihydrochloride crystallized. After recrystallization from methanol-ether the compound melted at 230° C. with decomposition.

I claim:

1. The process which comprises reacting by heating 4,4-diphenyl-2,5-oxazolidinedione with a member of the group consisting of a lower alkanol, a lower alkanethiol, a lower tertiaryaminoalkanol, and a lower tertiaryaminoalkanethiol in the presence of an hydrogen halide to form the corresponding α-amino-α,α-diphenylacetic acid ester hydrohalides and α-amino-α,α-diphenylthioacetic acid ester hydrohalides, said tertiaryaminoalkanol and tertiaryaminoalkanethiol being represented by the following formula:

wherein X stands for a member of the group consisting of oxygen and sulfur, R for a lower alkylene radical, and $R_1$ and $R_2$ are members of the class consisting of lower alkyl radicals and further members where $R_1$ and $R_2$ taken with N form a saturated heterocyclic radical.

2. The process as in claim 1 wherein the hydrogen halide is hydrogen chloride.

3. The process according to claim 1 wherein the oxazolidinedione is reacted with a lower tertiaryaminoalkanol.

4. The process according to claim 1 wherein the oxazolidinedione is reacted with a lower tertiaryaminoalkanethiol.

5. A compound of the group consisting of a tertiaryaminoalkyl ester and the salts thereof which in the form of the free base can be represented by the following formula:

wherein Ph is a phenyl radical, X is a member of the group consisting of oxygen and sulfur, R is a lower alkylene radical, and $R_1$ and $R_2$ are members of the class consisting of a lower alkyl radical and further members where $R_1$ and $R_2$ taken together with N form a saturated heterocyclic radical.

6. A compound according to claim 5 wherein the formula X stands for oxygen and N taken with $R_1$ and $R_2$ is a heterocyclic radical.

7. A compound according to claim 5 wherein the formula X stands for oxygen and $R_1$ and $R_2$ stand for lower alkyl radicals.

8. A compound according to claim 5 wherein the formula X stands for sulfur and $R_1$ and $R_2$ stand for lower alkyl radicals.

9. A process which comprises reacting by heating 4,4-diphenyl-2,5-oxazolidinedione with 2-dimethylaminoethanol in the presence of hydrogen chloride so as to produce 2-dimethylaminoethyl α-amino-α,α-diphenylacetate dihydrochloride.

10. A process which comprises reacting by heating 4,4-diphenyl-2,5-oxazolidinedione with 2-diethylaminoethanol hydrochloride in the presence of hydrogen chloride so as to produce 2-diethylaminoethyl α-amino-α,α-diphenylacetate dihydrochloride.

11. A process which comprises reacting by heating 4,4-diphenyl-2,5-oxazolidinedione with 2,2-dimethyl-3-diethylaminopropanol hydrochloride in the presence of hydrogen chloride so as to produce 2,2-dimethyl-3-diethylaminopropyl α-amino-α,α-diphenylacetate dihydrochloride.

12. A process which comprises reacting by heating 4,4-diphenyl-2,5-oxazolidinedione with 1-piperidineethanol in the presence of hydrogen chloride so as to produce 2-(1-piperidylethyl) α-amino-α,α-diphenylacetate dihydrochloride.

13. A process of reacting by heating 4,4-diphenyl-2,5-oxazolidinedione with 2-diethylaminoethanethiol hydrochloride in the presence of hydrogen chloride so as to produce 2-diethylaminoethyl α-amino-α,α-diphenylthiolacetate dihydrochloride.

14. 2-dimethylaminoethyl α-amino-α,α-diphenylacetate dihydrochloride.

15. 2-diethylaminoethyl α-amino-α,α-diphenylacetate dihydrochloride.

16. 2,2-dimethyl-3-diethylaminopropyl α-amino-α,α-diphenylacetate dihydrochloride.

17. 2-(1-piperidylethyl) α-amino-α,α-diphenylacetate dihydrochloride.

18. 2-diethylaminoethyl α-amino-α,α-diphenylthiolacetate dihydrochloride.

ROBERT DUSCHINSKY.

References Cited in the file of this patent

FOREIGN PATENTS

| Number | Country | Date |
|---|---|---|
| 65,376 | Denmark | Feb. 3, 1947 |

OTHER REFERENCES

Leuchs, Beilstein (Handbuch, 4th ed.), vol. 27, p. 245 (1937).

Leuchs et al., Beilstein (Handbuch, 4th ed.), vol. 27, p. 246 (1937).

Biltz, Liebigs Ann., vol. 391, pp. 215–230 (1912).